(12) United States Patent
Huang et al.

(10) Patent No.: US 10,481,250 B2
(45) Date of Patent: Nov. 19, 2019

(54) RADAR ANTENNA SYSTEM

(71) Applicant: Wistron NeWeb Corporation, Hsinchu (TW)

(72) Inventors: Guo-Shu Huang, Hsinchu (TW); Jeng-Da Li, Hsinchu (TW); Hsin-Lung Hsiao, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 379 days.

(21) Appl. No.: 15/172,128

(22) Filed: Jun. 2, 2016

(65) Prior Publication Data
US 2017/0149133 A1   May 25, 2017

(30) Foreign Application Priority Data
Nov. 25, 2015   (TW) .............................. 104139079 A

(51) Int. Cl.
*G01S 13/44*    (2006.01)
(52) U.S. Cl.
CPC ...... *G01S 13/4463* (2013.01); *G01S 13/4445* (2013.01); *G01S 13/4454* (2013.01); *G01S 13/4481* (2013.01)
(58) Field of Classification Search
CPC ............. G01S 13/4445; G01S 13/4454; G01S 13/4463; G01S 13/4481; G01S 3/32–325
USPC ......................................... 342/149–154, 427
See application file for complete search history.

(56) References Cited

U.S. PATENT DOCUMENTS

| | | | | |
|---|---|---|---|---|
| 4,499,472 A | * | 2/1985 | Willett | G01S 3/023 342/374 |
| 2002/0196185 A1 | * | 12/2002 | Bloy | G01S 3/04 342/435 |
| 2005/0156780 A1 | | 7/2005 | Bonthron | |
| 2007/0182619 A1 | * | 8/2007 | Honda | G01S 13/931 342/80 |
| 2007/0293150 A1 | * | 12/2007 | Ezal | G01S 3/32 455/25 |
| 2013/0113651 A1 | * | 5/2013 | Leise | H01Q 3/26 342/146 |
| 2016/0209504 A1 | * | 7/2016 | Steinhauer | G01S 3/20 |

FOREIGN PATENT DOCUMENTS

| | | |
|---|---|---|
| CN | 1673770 A | 9/2005 |
| TW | 201431174 A | 8/2014 |

OTHER PUBLICATIONS

J. Lan et al., Optimum unequally spaced arrays and their amplitude shading, IEEE Ultrasonics Symposium, 1995 (Year: 1995).*
English translation of TW 20141174 A (Year: 2014).*

* cited by examiner

*Primary Examiner* — Bernarr E Gregory
*Assistant Examiner* — Fred H Mull
(74) *Attorney, Agent, or Firm* — Winston Hsu

(57) ABSTRACT

A radar antenna system comprises a plurality of transmitting sub-arrays; a plurality of receiving sub-arrays; and a transceiving control unit coupled to the plurality of transmitting sub-arrays and the plurality of receiving sub-arrays, configured to control the plurality of transmitting sub-arrays and the plurality of receiving sub-arrays, such that the radar antenna system selectively operates in one of an amplitude-comparison mono-pulse mode and a phase-comparison mono-pulse mode.

10 Claims, 7 Drawing Sheets

RADAR ANTENNA SYSTEM

BACKGROUND OF THE INVENTION

1. Field of the Invention

The present invention relates to a radar antenna system, and more particularly, to a radar antenna system capable of selectively operating in one of the amplitude-comparison mono-pulse mode and the phase-comparison mono-pulse mode.

2. Description of the Prior Art

Radar has been widely used in military equipment and terrain exploration, and also used in detecting positions of different objects. An operational principle of radar is to transmit electromagnetic signal to the air and receive the reflected signal from an object, so as to calculate a direction, a range and a speed of the object. As radar technology evolves, the mono-pulse technology is widely used in the radar related area. Compared to traditional radar, the mono-pulse radar may obtain the direction and the range of the object by simply transmitting a mono-pulse signal. The mono-pulse radar has become one of the most popular radar recently.

Specifically, the mono-pulse radar detects a position of the object by receiving and analyzing the reflected signal received by the antenna. The mono-pulse radar having a fine angular resolution would be limited by a narrow angular scanning scope. On the other hand, the mono-pulse radar having a wide angular scanning scope would be suffered by a coarse angular resolution. Therefore, how to provide a radar antenna system having both fine angular resolution and wide angular scanning scope is a significant objective in the field.

SUMMARY OF THE INVENTION

It is therefore a primary objective of the present invention to provide a radar antenna system, which may selectively operate in one of the amplitude-comparison mono-pulse mode and the phase-comparison mono-pulse mode, to improve over disadvantages of the prior art.

An embodiment of the present invention discloses a radar antenna system comprising a plurality of transmitting sub-arrays; a plurality of receiving sub-arrays; and a transceiving control unit, coupled to the plurality of transmitting sub-arrays and the plurality of receiving sub-arrays, configured to control the plurality of transmitting sub-arrays and the plurality of receiving sub-arrays, such that the radar antenna system alternately operates in an amplitude-comparison mono-pulse mode and a phase-comparison mono-pulse mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
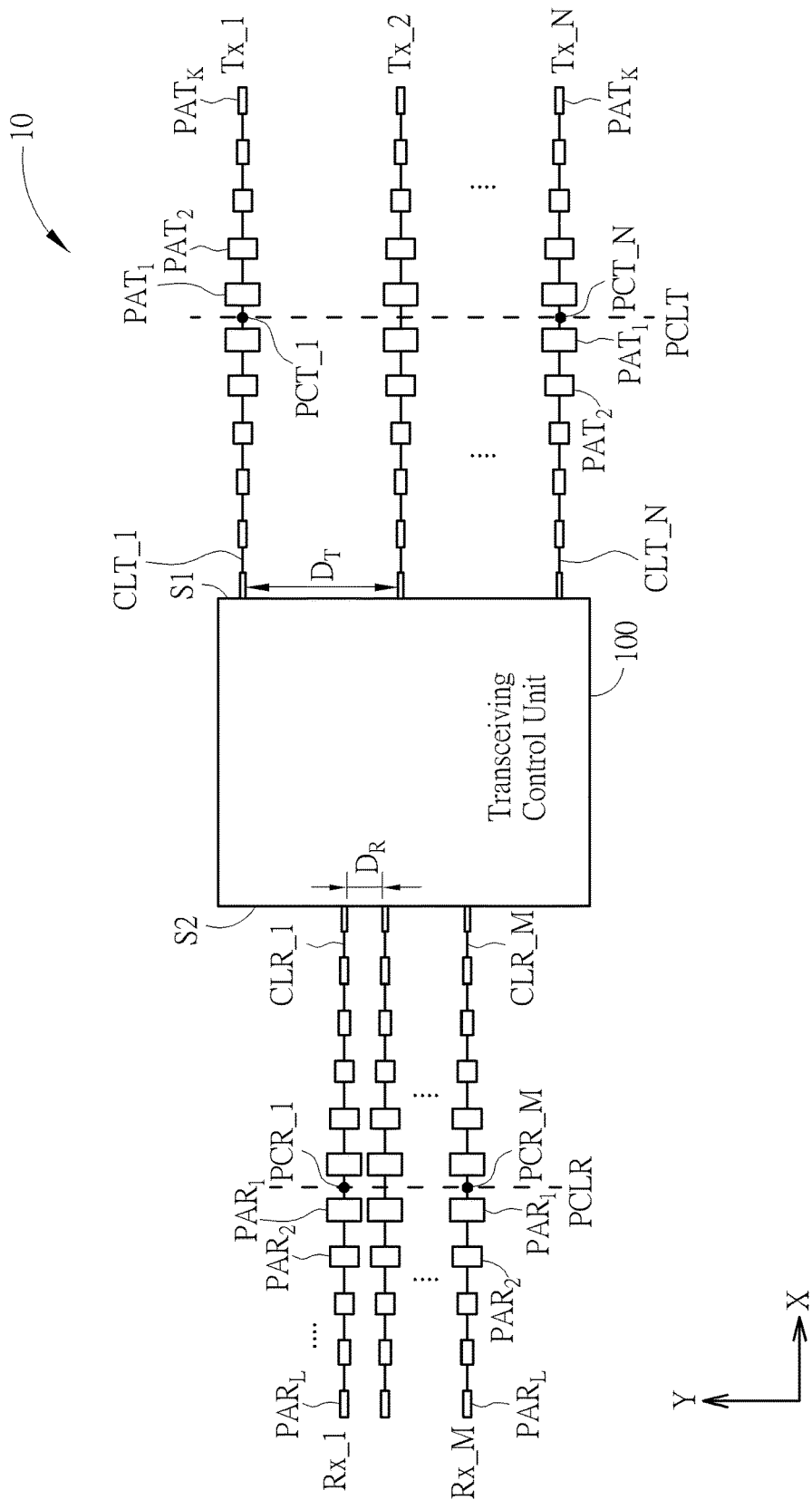
FIG. 1 is a schematic diagram of a radar antenna system according to an embodiment of the present invention.
Figure 2:
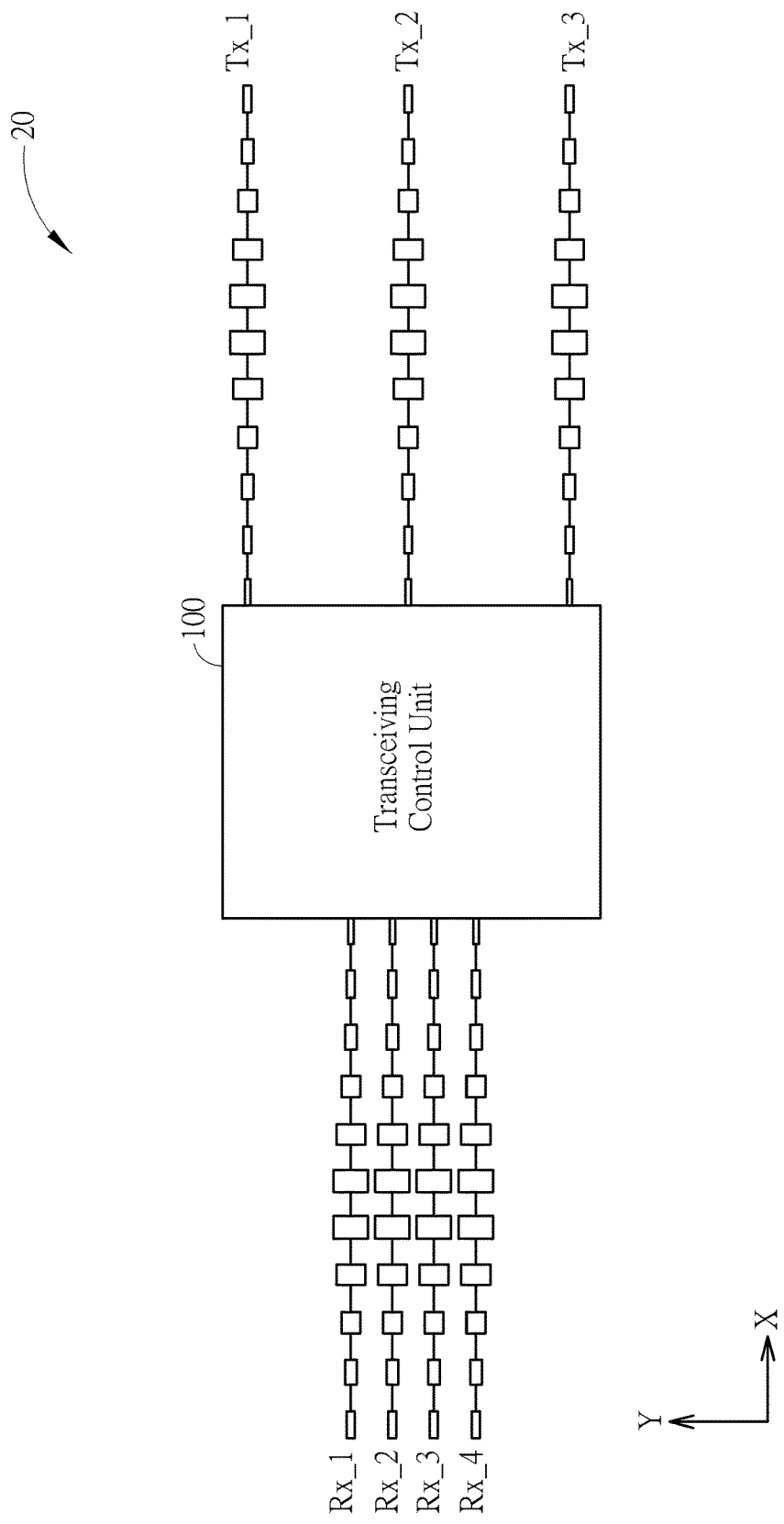
FIG. 2 is a schematic diagram of a radar antenna system according to an embodiment of the present invention.

FIG. 1 is a schematic diagram of a radar antenna system 10 according to an embodiment of the present invention, with a coordinate system labeled by X and Y axes. The radar antenna system 10 may operate at 77 GHz or operate in a frequency band, e.g., within 76 GHz~77 GHz. The radar antenna system 10 is an N-transmit M-receive (NTMR) antenna system. The radar antenna system 10 comprises a transceiving control unit 100, transmitting sub-arrays Tx_1-Tx_N and receiving sub-arrays Rx_1-Rx_M. The transmitting sub-arrays Tx_1-Tx_N are coupled to the transceiving control unit 100 and disposed at a first side S1 of the transceiving control unit 100. The receiving sub-arrays Rx_1-Rx_M are coupled to the transceiving control unit 100 and disposed at a second side S2 of the transceiving control unit 100. The first side S1 is opposite to the second side S2. A receiving distance DR is between a receiving sub-array Rx_r, of the receiving sub-arrays Rx_1-Rx_M, and an adjacent receiving sub-array Rx_r+1 (or receiving sub-array Rx_r−1). The receiving distance DR is substantially one half of a wavelength of a wireless signal transmitted by the radar antenna system 10. Similarly, a transmitting distance DT is between a transmitting sub-array Tx_t, of the transmitting sub-arrays Tx_1-Tx_N, and an adjacent transmitting sub-array Tx_t+1 (or transmitting sub-array Tx_t−1). The transmitting distance DT is an integer M times compared with the receiving distance DR, where the integer M is a number of the receiving sub-arrays Rx_1-Rx_M. The transceiving control unit 100 may control the transmitting sub-arrays Tx_1-Tx_N and the receiving sub-arrays Rx_1-Rx_M, such that the radar antenna system 10 selectively operates in one of an amplitude-comparison mono-pulse mode and a phase-comparison mono-pulse mode. When the radar antenna system 10 operates in the amplitude-comparison mono-pulse mode, the radar antenna system 10 may form a virtual antenna array, and forms N*M beams toward different directions, so as to distinguish an object in a certain angle. When the angle of the object related to the radar antenna system 10 is greater than a specific value, the radar antenna system 10 may switch to the phase-comparison mono-pulse mode from the amplitude-comparison mono-pulse mode. In other words, the radar antenna system 10 may adaptively operate in the amplitude-comparison mono-pulse mode or in the phase-comparison mono-pulse mode, which may achieve wide angular scanning scope and fine angular resolution.

Figure 7:
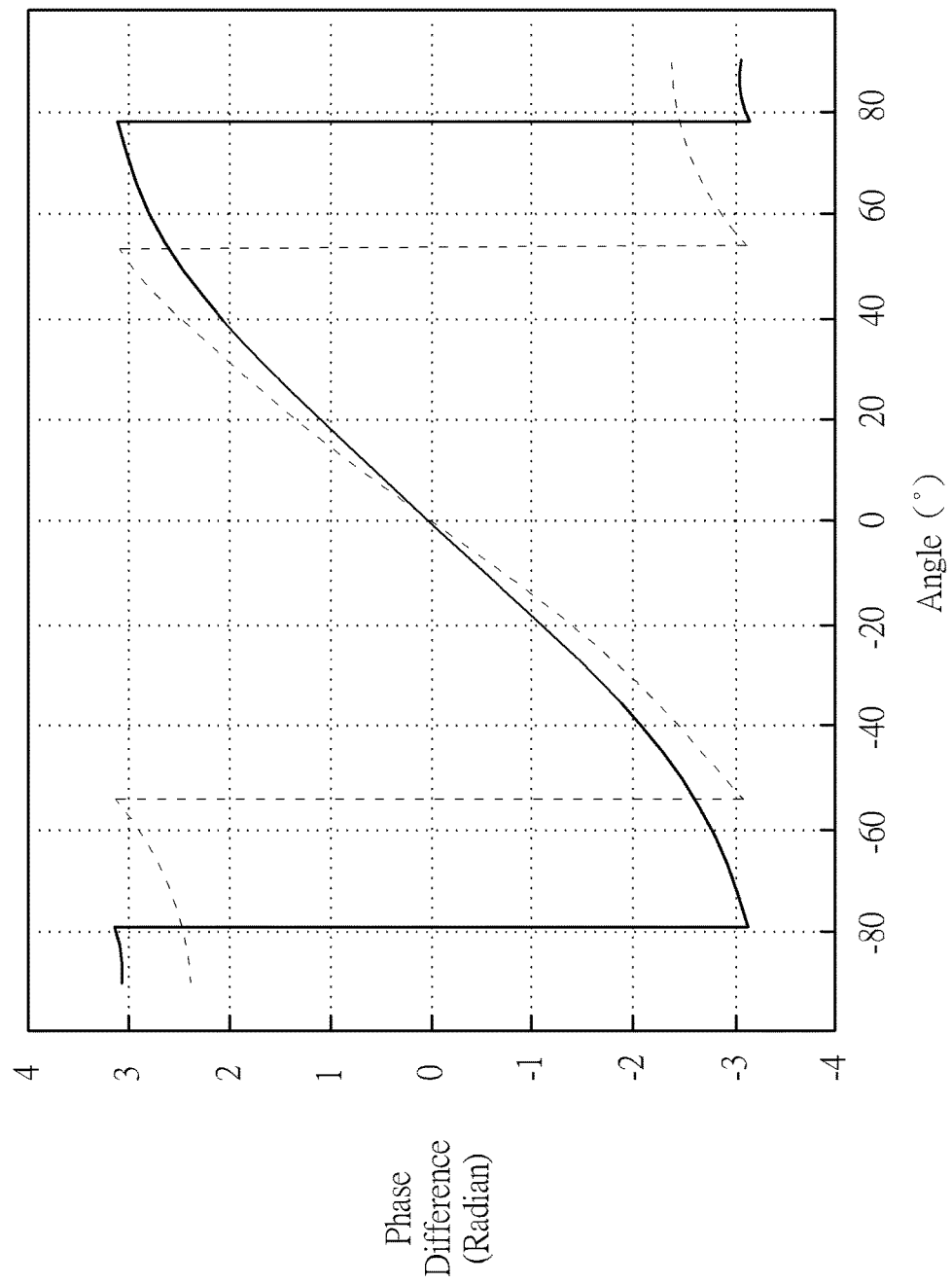
FIG. 7 illustrates a variation of a phase difference with respect to an angle of the radar antenna operating in phase-comparison mono-pulse mode.

In addition, the receiving distance DR is related to an angular scanning scope of the radar antenna system 10. The angular scanning scope increases as the receiving distance DR decreases. The larger the receiving distance DR, the smaller the angular scanning scope, and vice versa. Specifically, FIG. 7 illustrates a variation of a phase difference with respect to (w.r.t.) an angle of the radar antenna system 10 operating in the phase-comparison mono-pulse mode. A solid line represents the variation of the phase difference w.r.t. the angle when the receiving distance DR is a distance d1, and a dashed line represents the variation of the phase difference w.r.t. the angle when the receiving distance DR is a distance d2, where the distance d1 is smaller than the distance d2. As can be seen from FIG. 7, when the receiving distance DR is the distance d1 smaller than the distance d2, the angular scanning scope may achieve plus-and-minus 80 degrees. On the other hand, when the receiving distance DR is the distance d2 larger than the distance d1, the angular scanning scope is only plus-and-minus 60 degrees. That is, the angular scanning scope of the radar antenna system 10 increases as the receiving distance DR decreases. Preferably, the receiving distance DR is smaller than one half of the wavelength of the wireless signal transmitted by the radar antenna system 10, which would enlarge the angular scanning scope of the radar antenna system 10.

When the radar antenna system 10 operates in the amplitude-comparison mono-pulse mode, the transceiving control unit 100 utilizes at least two transmitting sub-arrays among the transmitting sub-arrays Tx_1-Tx_N to transmit the mono-pulse signal, and utilizes at least two receiving sub-arrays among the receiving sub-arrays Rx_1-Rx_M to receive the reflected signal. Preferably, when the radar antenna system 10 operates in the amplitude-comparison mono-pulse mode, the radar antenna system 10 forms a virtual antenna array, i.e., the transceiving control unit 100 utilizes all of the transmitting sub-arrays Tx_1-Tx_N to transmit the mono-pulse signal and utilizes all of the receiving sub-arrays Rx_1-Rx_M to receive the reflected signal, so as to achieve the fine angular resolution. On the other hand, when the radar antenna system 10 operates in the phase-comparison mono-pulse mode, the transceiving control unit 100 utilizes at least one transmitting sub-array among the transmitting sub-arrays Tx_1-Tx_N to transmit the mono-pulse signal and utilizes at least two receiving sub-arrays among the receiving sub-arrays Rx_1-Rx_M to receive the reflected signal. Preferably, when the radar antenna system 10 operates in the phase-comparison mono-pulse mode, the transceiving control unit 100 utilizes the receiving sub-array Rx_r and the adjacent receiving sub-array Rx_r+1 (or receiving sub-array Rx_r−1) to receive the reflected signal, so as to enhance the angular scanning scope. As described previously, the receiving distance DR is related to an angular scanning scope of the radar antenna system 10.

In addition, the transmitting sub-arrays Tx_1-Tx_N comprise transmitting phase centers PCT_1-PCT_N. The transmitting phase centers PCT_1-PCT_N are aligned with each other. In an embodiment, the transmitting phase centers PCT_1-PCT_N are aligned to a transmitting phase central line PCLT. Similarly, the receiving sub-arrays Rx_1-Rx_M comprise receiving phase centers PCR_1-PCR_M. The receiving sub-arrays Rx_1-Rx_M are aligned with each other. In an embodiment, the receiving phase centers PCR_1-PCR_M are aligned to a receiving phase central line PCLR.

In detail, each transmitting sub-array Tx_t within the transmitting sub-arrays Tx_1-Tx_N comprises transmitting radiating patches PAT1-PATK. The transmitting radiating patches PAT1-PATK of the transmitting sub-array Tx_t are connected in a series via a transmitting sub-array central line CLT_t parallel to the X-axis. The transmitting distance DT is the distance between the transmitting sub-array central line CLT_t of the transmitting sub-array Tx_t and a transmitting sub-array central line CLT_t+1 of the adjacent transmitting sub-array Tx_t+1 (or a transmitting sub-array central line CLT_t−1 of the adjacent transmitting sub-array Tx_t−1). Similarly, each receiving sub-array Rx_r within the receiving sub-arrays Rx_1-Rx_M comprises receiving radiating patches PAR1-PARL. The receiving radiating patches PAR1-PARL of the receiving sub-array Rx_r are connected in a series via a receiving sub-array central line CLR_r parallel to the X-axis. The receiving distance DR is the distance between the receiving sub-array central line CLR_r of the receiving sub-array Rx_r and a receiving sub-array central line CLR_r+1 of the adjacent receiving sub-array Rx_r+1 (or a receiving sub-array central line CLR_r−1 of the receiving sub-array Rx_r−1).

Furthermore, to suppress side-lobe effect, the transmitting radiating patches PAT1-PATK and the receiving radiating patches PAR1-PARL may have different lengths on a direction parallel to the Y-axis. In an embodiment, lengths of the transmitting radiating patches PAT1-PATK on the direction parallel to the Y-axis decrease as distances of the transmitting radiating patches PAT1-PATK in related to the phase center increase. Take the transmitting sub-array Tx_1 as an example, the transmitting radiating patch PAT1 has a shortest distance in related to the transmitting phase center PCT_1, and thus, the transmitting radiating patch PAT1 has a longest length on the direction parallel to the Y-axis. In contrast, the transmitting radiating patch PATK has a longest distance in related to the transmitting phase center PCT_1, and thus, the transmitting radiating patch PATK has a shortest length on the direction parallel to the Y-axis. Similarly, lengths of the receiving radiating patches PAR1-PARL on the direction parallel to the Y-axis decrease as distances of the receiving radiating patches PAR1-PARL in related to the phase center increase. Take the receiving sub-array Rx_1 as an example, the receiving radiating patch PAR1 has a shortest distance in related to the receiving phase centers PCR_1, and thus, the receiving radiating patch PAR1 has a longest length on the direction parallel to the Y-axis. In contrast, the receiving radiating patch PARL has a longest distance in related to the receiving phase centers PCR_1, and thus, the transmitting radiating patch PATK has a shortest length on the direction parallel to the Y-axis.

In addition, the transceiving control unit 100 may determine whether the radar antenna system 10 operates in the amplitude-comparison mono-pulse mode or the phase-comparison mono-pulse mode according to an angle AG of a target object TC in relation to the radar antenna system 10. For example, when the angle AG is greater than a specific value TH, the transceiving control unit 100 controls the transmitting sub-arrays Tx_1-Tx_N and the receiving sub-arrays Rx_1-Rx_M, such that the radar antenna system 10 operates in the phase-comparison mono-pulse mode with wide angular scanning scope. On the other hand, when the angle AG is smaller than the specific value TH, the transceiving control unit 100 controls the transmitting sub-arrays Tx_1-Tx_N and the receiving sub-arrays Rx_1-Rx_M, such that the radar antenna system 10 operates in the amplitude-comparison mono-pulse mode with fine angular resolution. Moreover, the radar antenna system 10 is not limited in any specific method to determine whether the angle AG is greater/smaller than the specific value TH. In an embodiment, when the radar antenna system 10 operates in the amplitude-comparison mono-pulse mode, the radar antenna system 10 may form as a one-transmit N*M-receive virtual antenna array, and also form beams BM1-BMN*M towards different directions via a time division technique, where the beam BM1 and the beam BMN*M have the largest angle deviation. When the reflected signal corresponding to the target object TC has large energy in either the beam BM1 or the beam BMN*M, it represents that the angle AG of the target object TC may be beyond the angular scanning scope provided by the radar antenna system 10 operating in the amplitude-comparison mono-pulse mode, and the transceiving control unit 100 determines that the angle AG is greater than the specific value TH. In such a situation, the radar antenna system 10 chooses to operate in the phase-comparison mono-pulse mode. In contrast, when the reflected signal corresponding to the target object TC has large energy in one of the beams BM2-BMN*M-1, it represents that the angle AG of the target object TC is still within the angular scanning scope provided by the radar antenna system 10 operating in the amplitude-comparison mono-pulse mode, and the transceiving control unit 100 determines that the angle AG is smaller than the specific value TH. In such a situation, the radar antenna system 10 chooses to operate in the amplitude-comparison mono-pulse mode. As can be seen from the above, the transceiving control unit 100 may determine whether the angle AG is greater the specific value TH, and according to the determination result, determine whether to operate in the amplitude-comparison mono-pulse mode or the phase-comparison mono-pulse mode.

Figure 3:
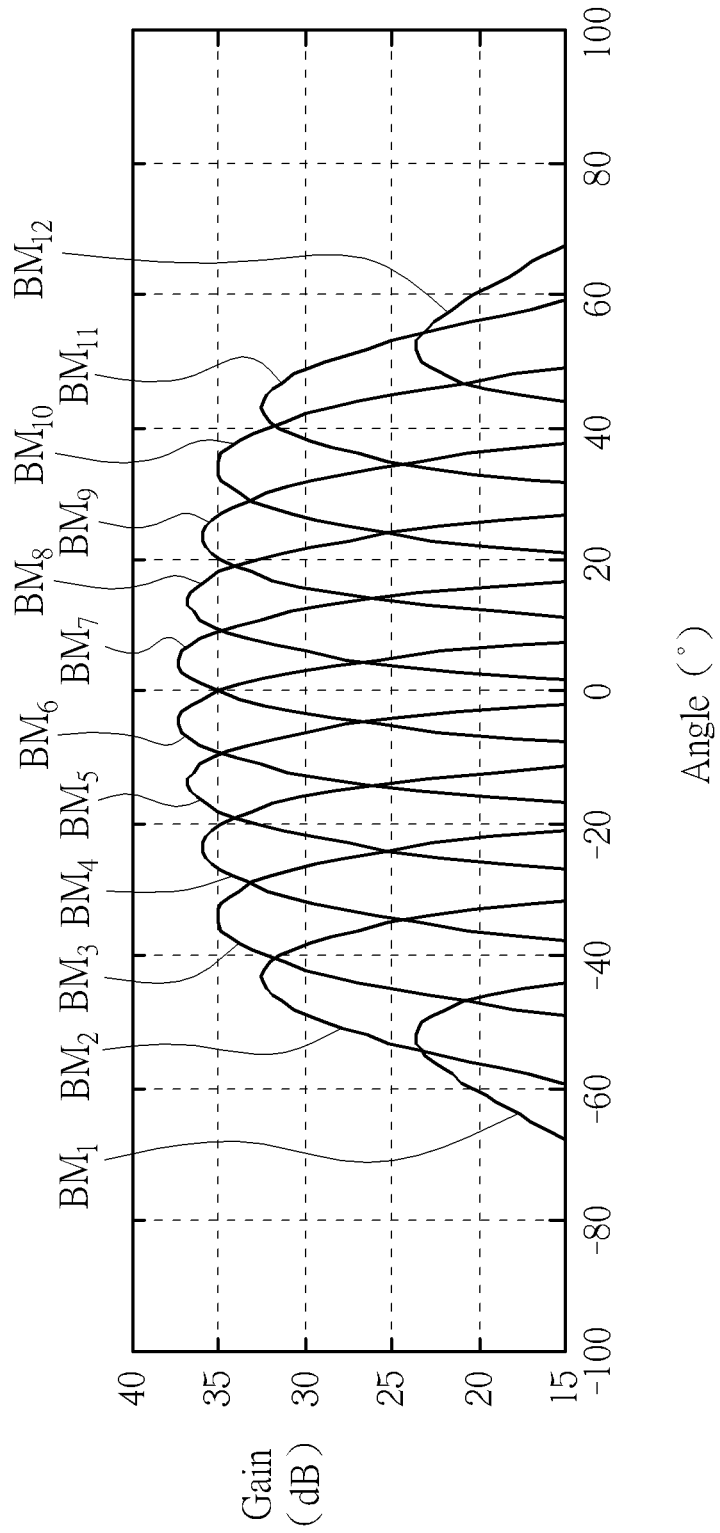
FIG. 3 is a diagram of radiation pattern of the radar antenna in FIG. 2.
Figure 4:
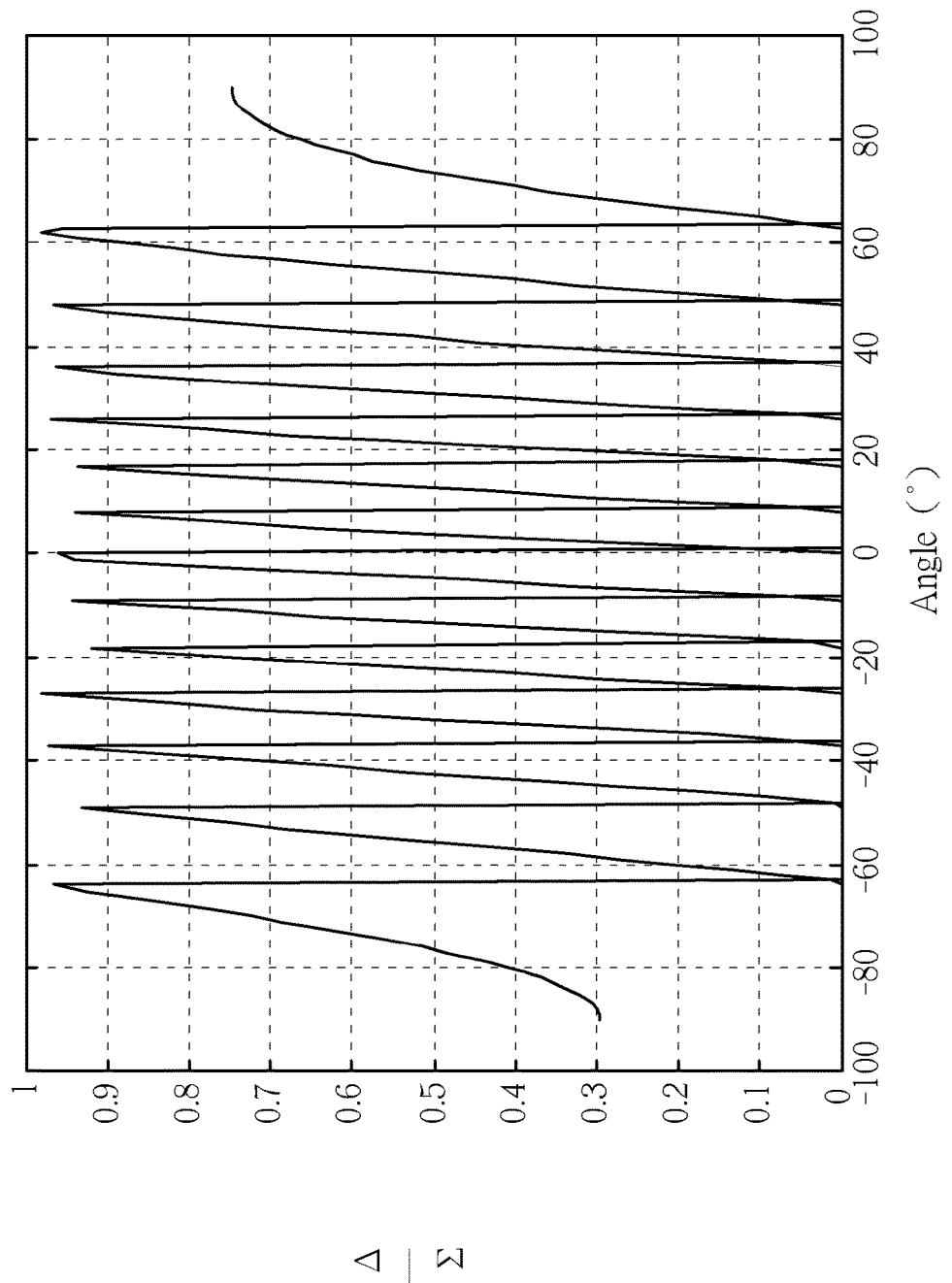
FIG. 4 is a diagram of a delta-to-sum ratio of the radar antenna in FIG. 2 operating in amplitude-comparison mono-pulse mode.
Figure 5:
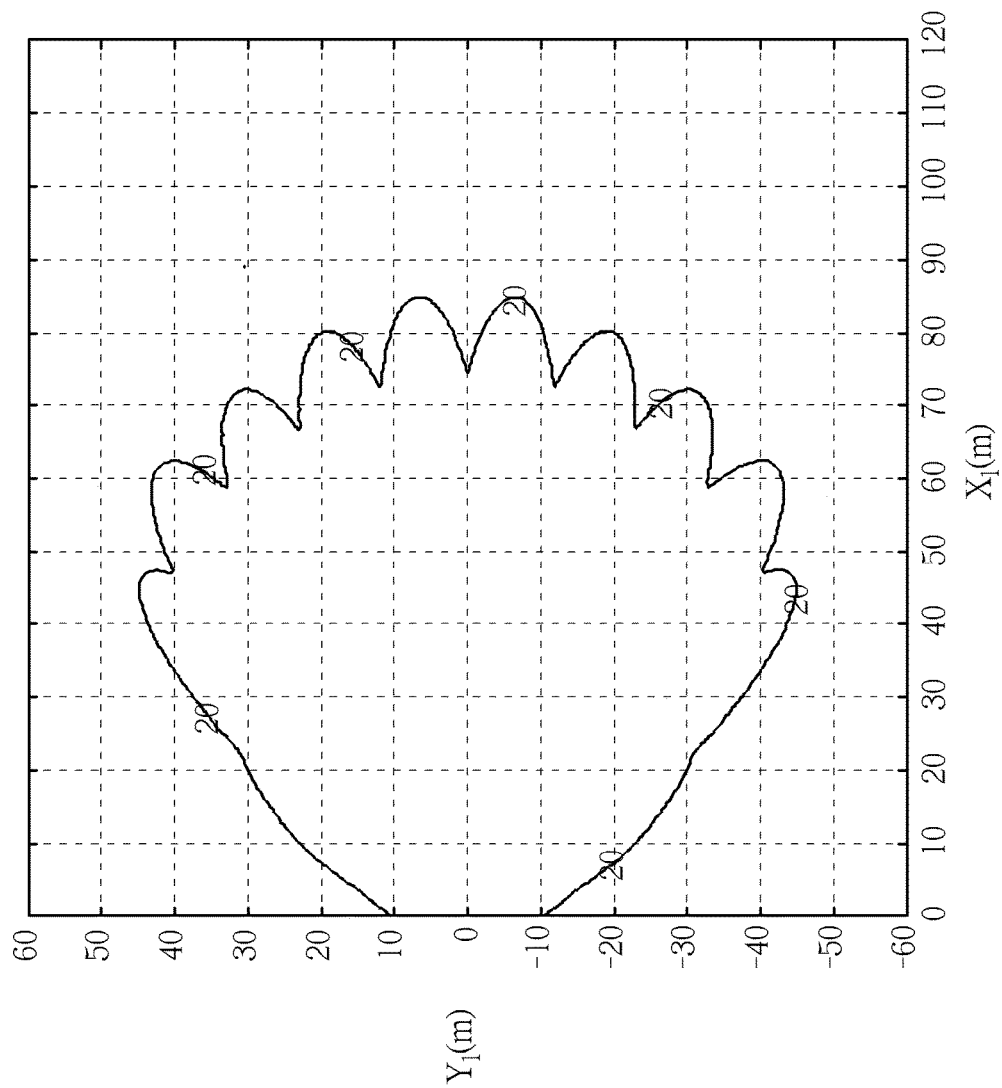
FIG. 5 is a diagram of a radiation pattern of the radar antenna in FIG. 2 operating in the amplitude-comparison mono-pulse mode.
Figure 6:
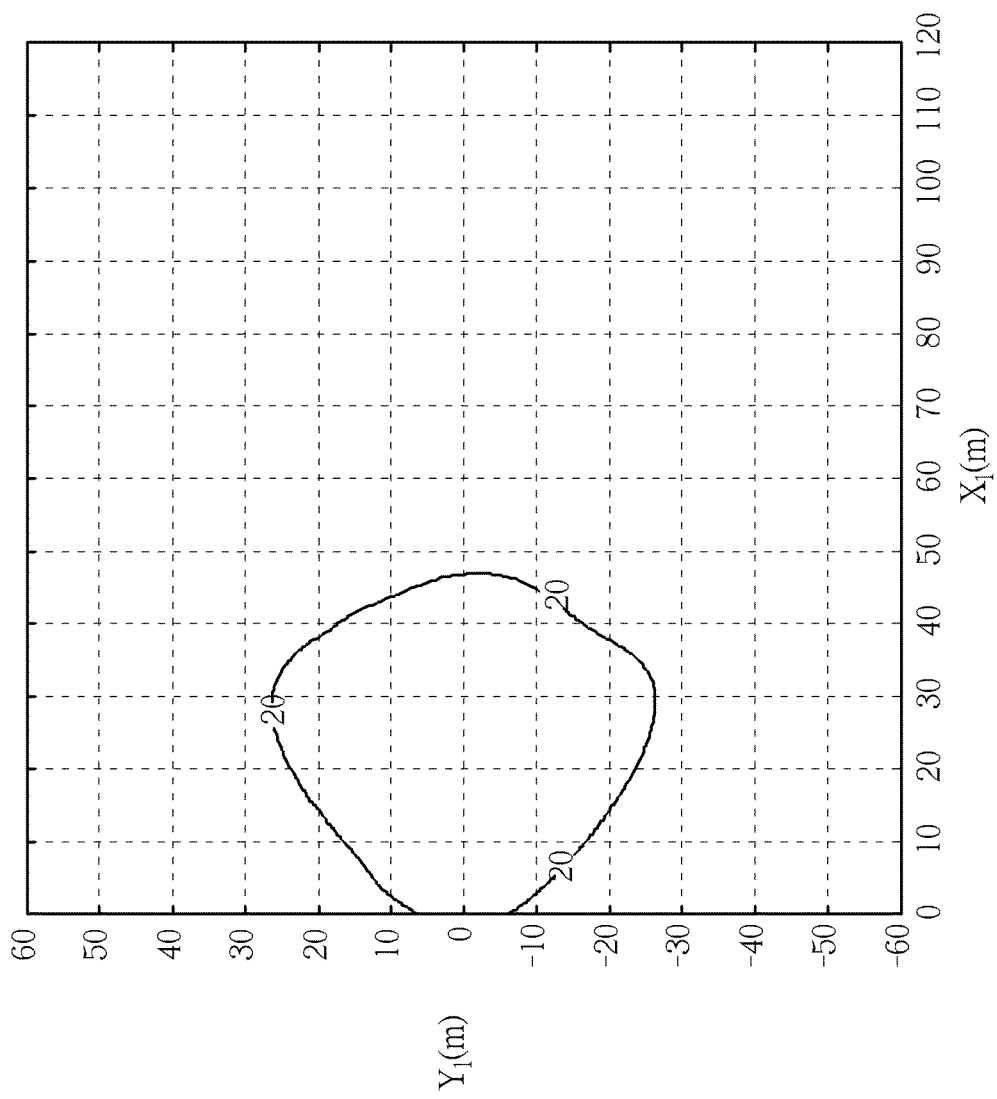
FIG. 6 is a diagram of a radiation pattern of the radar antenna in FIG. 2 operating in the phase-comparison mono-pulse mode.

Specifically, referring to FIGS. 2 to 6, FIG. 2 is a schematic diagram of a radar antenna system 20 according to an embodiment of the present invention. FIG. 3 is a diagram of radiation pattern of the radar antenna 20. FIG. 4 is a diagram of a delta-to-sum ratio of the radar antenna 20 operating in the amplitude-comparison mono-pulse mode. FIG. 5 is a diagram of a radiation pattern of the radar antenna 20 operating in the amplitude-comparison mono-pulse mode when a signal-to-noise ratio (SNR) is 20 dB. FIG. 6 is a diagram of a radiation pattern of the radar antenna 20 operating in phase-comparison mono-pulse mode when the SNR is 20 dB. The radiation patterns of FIG. 5 and FIG. 6 are illustrated onto a plane constructed by an X1-axis and an Y1-axis. The radar antenna system 20 is similar to the radar antenna system 10, and thus, the same components are denoted by the same symbols. Different from the radar antenna system 10, the radar antenna system 20 is a three-transmit four-receive (3T4R) antenna system, such that the radar antenna system 20 is equivalent to a one-transmit twelve-receive virtual antenna array. That is, the radar antenna system 20 may form beams BM1-BM12 toward twelve different directions, as shown in FIG. 3, where the beams BM1, BM12 have large angle deviation. The angle AG of the target object TC is not able to be computed accurately, if the reflected signal corresponding to the target object TC has large energy in either the beam BM1 or the beam BM12, due to factors brought by side-lobes and grating lobes of the beams BM1, BM12. Hence, the angular scanning scope of the radar antenna system 20 operating in the amplitude-comparison mono-pulse mode degrades as merely plus-and-minus 55 degrees, while the angular scanning scope of the radar antenna system 20 operating in the phase-comparison mono-pulse mode may achieve plus-and-minus 80 degrees. When the radar antenna system 20 detects that the reflected signal corresponding to the target object TC has large energy within the beam BM1 or the beam BM12, the transceiving control unit 100 controls the radar antenna system 20 to operate in the phase-comparison mono-pulse mode, so as to widen the angular scanning scope thereof. On the other hand, when the radar antenna system 20 detects that the reflected signal corresponding to the target object TC has large energy within one of the beams BM2-BM11, the transceiving control unit 100 controls the radar antenna system 20 to operate in the amplitude-comparison mono-pulse mode, so as to achieve finer angular resolution. Therefore, the radar antenna system 20 may achieve both wide angular scanning scope and fine angular resolution.

As can be seen from the above, the radar antenna system of the present invention is able to alternately operate in the amplitude-comparison mono-pulse mode and the phase-comparison mono-pulse mode according to the angle AG of the target object TC, so as to achieve wide angular scanning scope and fine angular resolution. Notably, the embodiments stated in the above are utilized for illustrating the concept of the present invention. Those skilled in the art may make modifications and alternations accordingly, and not limited herein. For example, a number of the transmitting sub-arrays and a number of the receiving sub-arrays are not limited. As long as the number of the transmitting/receiving sub-arrays is greater than one, requirements of the present invention is satisfied. In addition, a number of transmitting/receiving radiating patches included in the transmitting/receiving sub-array is not limited. As long as the transmitting phase centers are aligned with each other and the receiving phase centers are aligned with each other, requirements of the present invention is satisfied.

In summary, the radar antenna system of the present invention alternately operates in the amplitude-comparison mono-pulse mode and the phase-comparison mono-pulse mode. Compared to the prior art, the radar antenna system of the present invention achieves both wide angular scanning scope as well as fine angular resolution.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method, applied in a radar antenna system comprising a plurality of transmitting sub-arrays and a plurality of receiving sub-arrays, the method comprising:
   determining whether an angle of an object in relation to the radar antenna system is greater a specific value and control the plurality of transmitting sub-arrays and the plurality of receiving sub-arrays, such that the radar antenna system selectively operates in one of an amplitude-comparison mono-pulse mode and a phase-comparison mono-pulse mode;
   when the angle is greater than the specific value, controlling the plurality of transmitting sub-arrays and the plurality of receiving sub-arrays such that the radar antenna system operates in the phase-comparison mono-pulse mode;
   when the angle is smaller than the specific value, controlling the plurality of transmitting sub-arrays and the plurality of receiving sub-arrays such that the radar antenna system operates in the amplitude-comparison mono-pulse mode.

2. The method of claim 1, wherein a transmitting distance is a distance between a transmitting sub-array and another transmitting sub-array among the plurality of transmitting sub-arrays, a receiving distance is a distance between a receiving sub-array and another receiving sub-array among the plurality of receiving sub-arrays, the transmitting distance is a specific number times compared with the receiving distance, and the specific number is a number of the plurality of receiving sub-arrays.

3. The method of claim 2, wherein the receiving distance is substantially one half of a wavelength of a wireless signal transmitted by the radar antenna system.

4. The method of claim 2, wherein an angular scanning scope of the radar antenna system increases as the receiving distance decreases.

5. The method of claim 2, wherein the receiving distance is smaller than one half of a wavelength of a wireless signal transmitted by the radar antenna system.

6. The method of claim 1, wherein each transmitting sub-array comprises a transmitting phase center, the transmitting phase centers of the plurality of transmitting sub-arrays are aligned with each other; each receiving sub-array comprises a receiving phase center, the receiving phase centers of the plurality of receiving sub-arrays are aligned with each other.

7. The method of claim 1, wherein when the radar antenna system operates in the phase-comparison mono-pulse mode, the radar antenna system performs wireless transmission via a least a transmitting sub-array of the plurality of transmitting sub-arrays, and performs wireless reception via at least two receiving sub-arrays of the plurality of receiving sub-arrays.

8. The method of claim 1, wherein when the radar antenna system operates in the amplitude-comparison mono-pulse mode, the radar antenna system performs wireless transmission via a least two transmitting sub-arrays of the plurality of transmitting sub-arrays, and performs wireless reception via at least two receiving sub-arrays of the plurality of receiving sub-arrays.

9. The method of claim 1, further comprising:
determining whether the radar antenna system operates in the amplitude-comparison mono-pulse mode or the phase-comparison mono-pulse mode according to the angle of the object in relation to the radar antenna system.

10. The method of claim 1, further comprising:
when the radar antenna system operates in the amplitude-comparison mono-pulse mode, the radar antenna system forming a plurality of beams towards different directions;
determining whether the angle is greater than the specific value and determining whether to select from the amplitude-comparison mono-pulse mode to the phase-comparison mono-pulse mode according to an energy of an object reflection signal corresponding to at least one of the plurality of beams.

* * * * *